(12) United States Patent
Oh

(10) Patent No.: US 8,947,781 B2
(45) Date of Patent: Feb. 3, 2015

(54) MONITORING SYSTEM FOR GENERATING 3-DIMENSIONAL IMAGE AND METHOD OF MEASURING DISTANCE BY USING THE IMAGE

(75) Inventor: Jae-Yoon Oh, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 375 days.

(21) Appl. No.: 13/458,499

(22) Filed: Apr. 27, 2012

(65) Prior Publication Data
US 2012/0275022 A1 Nov. 1, 2012

(30) Foreign Application Priority Data
Apr. 27, 2011 (KR) .................. 10-2011-0039716

(51) Int. Cl.
*G02B 27/22* (2006.01)
*G01B 11/24* (2006.01)
*G01B 11/02* (2006.01)
*G01B 11/245* (2006.01)
*H04N 13/02* (2006.01)

(52) U.S. Cl.
CPC .............. *G01B 11/24* (2013.01); *G01B 11/026* (2013.01); *G01B 11/245* (2013.01); *H04N 13/0242* (2013.01)
USPC ............................ 359/466; 359/467; 359/470

(58) Field of Classification Search
None
See application file for complete search history.

(56) References Cited

U.S. PATENT DOCUMENTS

| | | | |
|---|---|---|---|
| 6,665,003 B1 * | 12/2003 | Peleg et al. | ..................... 348/36 |
| 7,194,112 B2 | 3/2007 | Chen et al. | |
| 2002/0036649 A1 | 3/2002 | Kim et al. | |
| 2007/0103544 A1 | 5/2007 | Nakazawa | |
| 2007/0200926 A1 | 8/2007 | Chianglin | |
| 2008/0002878 A1 * | 1/2008 | Meiyappan | ................... 382/154 |
| 2008/0303894 A1 | 12/2008 | Ernst et al. | |

FOREIGN PATENT DOCUMENTS

| | | |
|---|---|---|
| JP | 2002366948 A | 12/2002 |
| JP | 2004240153 A | 8/2004 |
| KR | 1020000072269 A | 12/2000 |
| KR | 1020020025301 A | 4/2002 |
| KR | 1020040064966 A | 7/2004 |
| KR | 1020040104777 A | 12/2004 |
| KR | 1020060096708 A | 9/2006 |
| KR | 1020080077391 A | 8/2008 |

* cited by examiner

*Primary Examiner* — Jade R Chwasz
(74) *Attorney, Agent, or Firm* — Sughrue Mion, PLLC

(57) ABSTRACT

A monitoring system for generating a three-dimensional (3D) image, the system including: a plurality of monitoring cameras which are arranged to capture respective images of an area such that a portion of an angle of view of one monitoring camera overlaps a portion of an angle of view of another monitoring camera; and a controller which crops a plurality of overlapped images, each of which is an image of the overlapped portion, from among the respective images captured by the plurality of monitoring cameras, and generates a 3D image by adding the overlapped images.

9 Claims, 10 Drawing Sheets

MONITORING SYSTEM FOR GENERATING 3-DIMENSIONAL IMAGE AND METHOD OF MEASURING DISTANCE BY USING THE IMAGE

CROSS-REFERENCE TO RELATED PATENT APPLICATION

This application claims priority from Korean Patent Application No. 10-2011-0039716, filed on Apr. 27, 2011, in the Korean Intellectual Property Office, the disclosures of which are incorporated herein in their entirety by reference.

BACKGROUND

1. Field

Apparatuses and methods consistent with exemplary embodiments relate to a monitoring camera, and more particularly, to a monitoring system for generating a three-dimensional (3D) image to monitor an object and method of measuring a distance between the camera and the object by using the image.

2. Description of the Related Art

A monitoring system includes a monitoring camera and analyzes an image captured by the monitoring camera, and then, monitors a specific area. Generally, one monitoring camera is installed in the monitoring system, and thus, the image captured by the monitoring camera is displayed two-dimensionally on a monitor. As the performance of the monitoring camera gradually develops, the monitoring camera performs a function of monitoring a circumstance of surroundings while performing a pan operation for rotating 360° in a horizontal direction, a tilt operation for rotating in 90° in a vertical direction, and a zoom operation for enlarging or reducing an object to photograph the object.

In related art monitoring systems, one observer is connected per one monitoring camera to perform a monitoring. That is, since an image output from the monitoring camera is only one, it is impossible to obtain an image of another angle by another connector. Thus, only an area corresponding to a monitoring angle currently under photography from among an entire monitoring area may be monitored, and the remaining area is a blind spot in monitoring. This is because, since the monitoring camera physically performs the pan, tile and zoom operations and only one mechanical driver for the operations exists per the monitoring camera, it is impossible to monitor another area than an area corresponding to specific coordinates if the specific coordinates are determined.

In addition, related art monitoring cameras do not have a function of generating a 3D image. If it is possible to generate a three-dimensional image, a monitoring function such as estimating a distance from a monitoring camera to an object can be markedly improved. Although a stereo vision is embodied by using two monitoring cameras, there may be a blind spot in monitoring another area than an area corresponding to a monitoring angle. In order to address this problem, to perform an onmidirectional monitoring and obtain a 3D image, without using the mechanical driver, is needed.

SUMMARY

One or more exemplary embodiments provide a monitoring camera for generating a 3D image, and a method of measuring distance between the camera and an object by using the image.

According to an aspect of an exemplary embodiment, there is provided a system for monitoring an area, the system including: a plurality of monitoring cameras which are arranged to capture respective images of an area such that a portion of an angle of view of one monitoring camera overlaps a portion of an angle of view of another monitoring camera; and a controller which crops a plurality of overlapped images, each of which is an image of the overlapped portion, from among the respective images captured by the plurality of monitoring cameras, and generates a 3D image by adding the overlapped images.

The controller may include an angle of view setter which sets an angle of view at which each of the plurality of monitoring cameras captures a respective image the area; a crop unit which crops the overlapped images from among the respective images captured by the plurality of monitoring cameras; and a 3D image generator which generates the 3D image of the area by adding the overlapped images cropped by the first crop unit.

The angle of view of each of the monitoring cameras may be changed by a user, and space information about the area may be obtained from the 3D image.

The controller may add to the 3D image another 3D image generated by adding another plurality of overlapped images cropped from among the respective images, to generate a 3D panorama image of the area.

The monitoring system may further include a first crop unit which receives an external signal, crops at least one partial image designated by the external signal from the 3D image, and outputs the cropped at least one partial image to the outside.

The external signal may include at least one set of coordinates and the first crop unit crops the at least one partial image corresponding to the at least one set of coordinates of the external signal.

The crop unit may be connected to a plurality of external devices and may crop and output partial images requested by the plurality of external devices from the 3D image.

The controller may include an angle of view setter which sets an angle of view at which each of the plurality of monitoring cameras captures a respective image the area; a crop unit which crops the overlapped images from among the respective images captured by the plurality of monitoring cameras; and a 3D image generator which generates the 3D image of the area by adding the overlapped images cropped by the first crop unit.

In the monitoring system, a plurality of monitoring cameras may be fixedly installed in a horizontal circular form, and angles of view of adjacent monitoring cameras are set to overlap with each other by half.

Thus, it is possible to generate a 3D panorama image by adding the overlapped images in order. It is possible to extract space information about a specific object from the 3D panorama image.

In addition, using the monitoring system, it is possible to monitor portion of the area at various positions by using an electrical control instead of a mechanical driving such as a panning driving or a tilting driving of each of the monitoring cameras. That is, it is possible to monitor the portions of the area at various positions through an electrical panning driving and an electrical tilting driving.

In addition, it is possible to monitor the area through a multi-access. That is, a plurality of observers may see images corresponding to the portions of the area by cropping the overlapped images from the 3D panorama image stored in a storing unit, by using a plurality of external devices. Thus, the plurality of observers may simultaneously monitor the area desired by the plurality of observers.

BRIEF DESCRIPTION OF THE DRAWINGS

The above and other aspects will become more apparent by describing in detail exemplary embodiments thereof with reference to the attached drawings, in which.

DETAILED DESCRIPTION EXEMPLARY EMBODIMENTS

Figure 1:
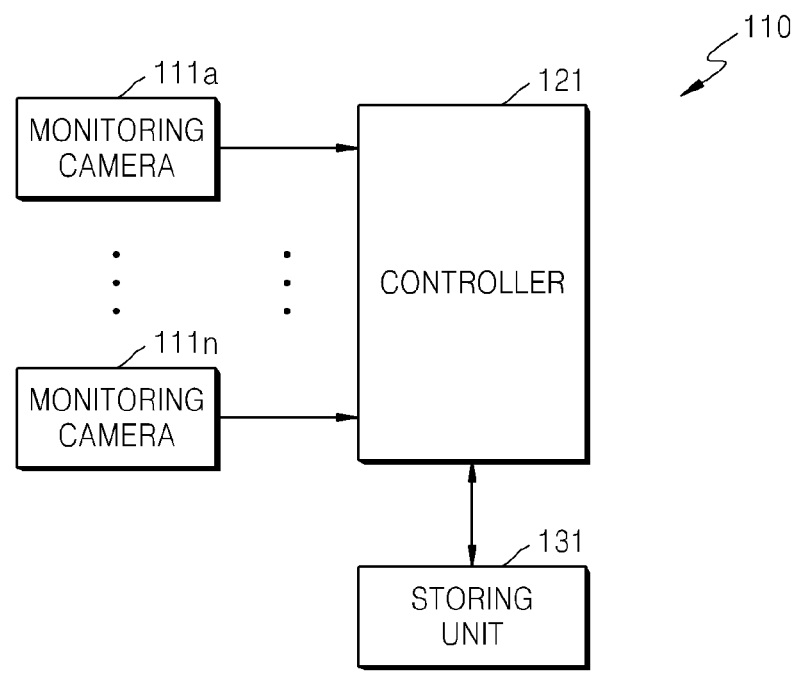
FIG. 1 is a block diagram of a monitoring system according to an exemplary embodiment.

Hereinafter, the inventive concept will now be described more fully with reference to the accompanying drawings, in which exemplary embodiments are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. In the present specification, like reference numerals and symbols refer to like elements throughout.

FIG. 1 is a block diagram of a monitoring system 110 according to an exemplary embodiment. Referring to FIG. 1, the monitoring system 100 includes a plurality of monitoring cameras 111a through 111n, a controller 121, and a storing unit 131.

Each of the plurality of monitoring cameras 111a through 111n photographs an area in sight, and transmits an image of the area to the controller 121. Each of the plurality of monitoring cameras 111a through 111n may include an imaging unit and an image pickup unit.

The imaging unit photographs the area in sight, and transmits the image of the area in sight to the image pickup unit (not shown). The imaging unit includes a lens system (not shown) including at least one lens through which the image of the area in sight is obtained. The lens system may include a zoom lens (not shown) having a zoom function and a focus lens (not shown) having a focus adjusting function. The lens system may also include an optical low pass filter (not shown) for removing optical noise.

The image pickup unit includes a plurality of image pickup devices for converting the image transmitted from the imaging unit to an electric signal and outputting the electric signal. The image pickup unit includes a charge-coupled device (CCD) or a complementary metal oxide semiconductor (CMOS) to convert the image obtained from the lens system to an analog signal and transmit the analog signal to the controller 121.

Each of the plurality of monitoring cameras 111a through 111n may perform a panning operation for rotating 360° in a horizontal direction by using a built-in pan motor (not shown), perform a tilting operation for rotating in 90° in a vertical direction by using a built-in tilt motor (not shown), and perform a zooming operation for enlarging or reducing an image of an object in sight.

The controller 121 is electrically connected to the plurality of monitoring cameras 111a through 111n, and controls panning operations, tilting operations, zooming operations, and photographing operations of the plurality of monitoring cameras 111a through 111n. The controller 121 converts image data output in an analog form from each of the plurality of monitoring cameras 111a through 111n to digital data, and processes the digital data. The controller 121 captures images overlapped by adjacent monitoring cameras from among images captured by the plurality of monitoring cameras 111a through 111n, and generates a 3D panorama image by adding the overlapped images. An image output from the controller 121 may be stored in the storing unit 131, and may be displayed on a monitor (not shown) or transmitted to another device through a network. The controller 121 will be described in detail with reference to FIG. 4 below.

The storing unit 131 may include a storage device such as a hard disk or server having a large storing capacity.

Figure 2:
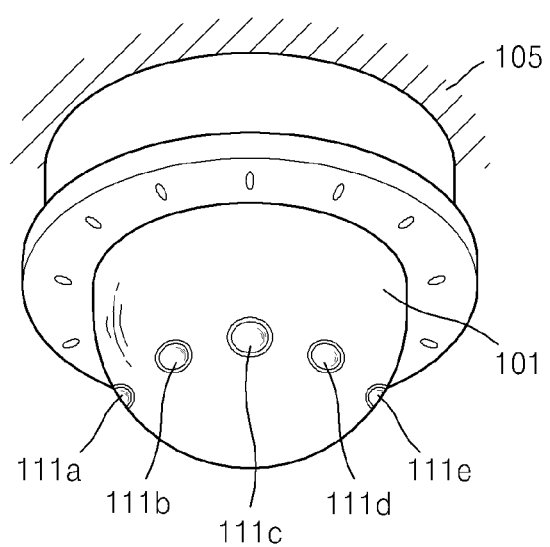
FIG. 2 is a perspective side view showing a state in which some of a plurality of monitoring cameras illustrated in FIG. 1 is installed, according to an exemplary embodiment.
Figure 3:
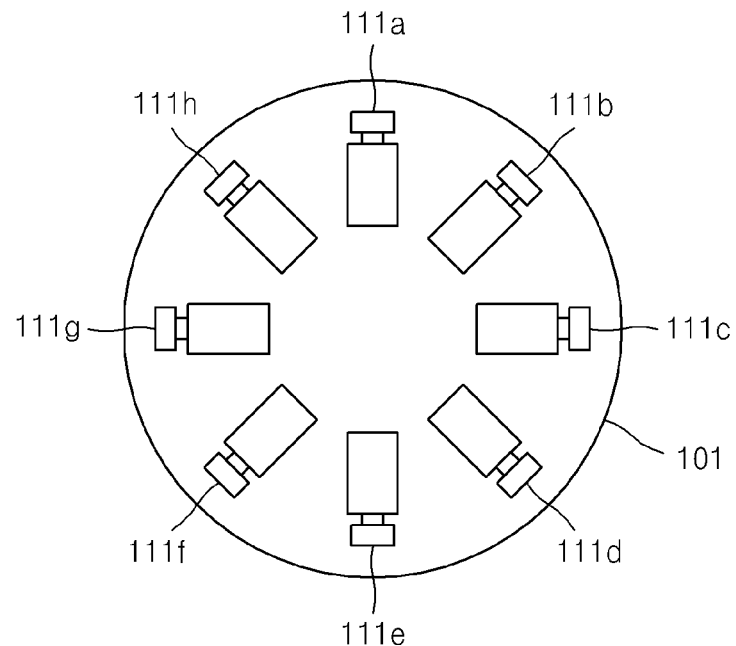
FIG. 3 is a plan view showing some of the plurality of monitoring cameras, according to an exemplary embodiment.

FIG. 2 is a perspective side view showing a state in which some of the plurality of monitoring cameras 111a through 111n illustrated in FIG. 1 is installed, and FIG. 3 is a plan view showing some of the plurality of monitoring cameras 111a through 111n, according to exemplary embodiments.

Referring to FIGS. 2 and 3, the plurality of monitoring cameras 111a through 111h are installed inside a protection device 101. The plurality of monitoring cameras 111a through 111h are arranged in a horizontal circular form. The plurality of monitoring cameras 111a through 111h are fixedly installed in the protection device 101, and fixedly photograph the front of a preset place. The plurality of monitoring cameras 111a through 111h are protected or concealed from external factors by the protection device 101.

The protection device 101 is fabricated in a transparent form so that the plurality of monitoring cameras 111a through 111h may photograph the outside. In addition, the protection device 101 may be fabricated so that the plurality of monitoring cameras 111a through 111h are not seen from the outside. The protection device 101 is installed to be fixable to a ceiling or a specific place. If necessary, the plurality of monitoring cameras 111a through 111h may be installed without the protection device 101. However, the inventive concept is not limited to an arrangement of the plurality of monitoring cameras 111a through 111h as shown in FIGS. 2-3. The plurality of monitoring cameras 111a through 111h may be arranged in a different manner to photograph an image of the area.

Figure 4:
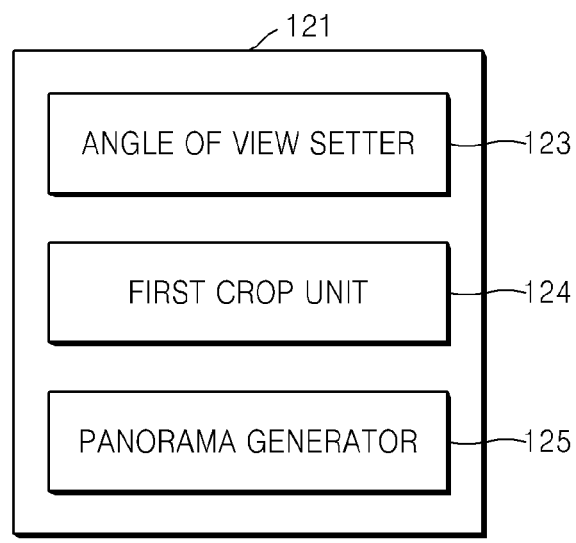
FIG. 4 is a block diagram of a controller illustrated in FIG. 1, according to an exemplary embodiment.

FIG. 4 is a block diagram of the controller 121 illustrated in FIG. 1, according to an exemplary embodiment. Referring to FIG. 4, the controller 121 includes an angle of view setter 123, a first crop unit 124, and a panorama generator 125.

Figure 5:
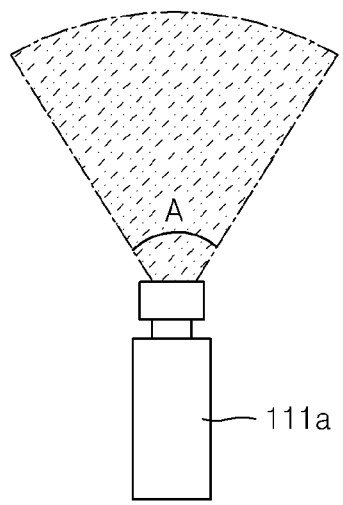
FIG. 5 is a diagram for explaining an angle of view of a monitoring camera, according to an exemplary embodiment.
Figure 6:
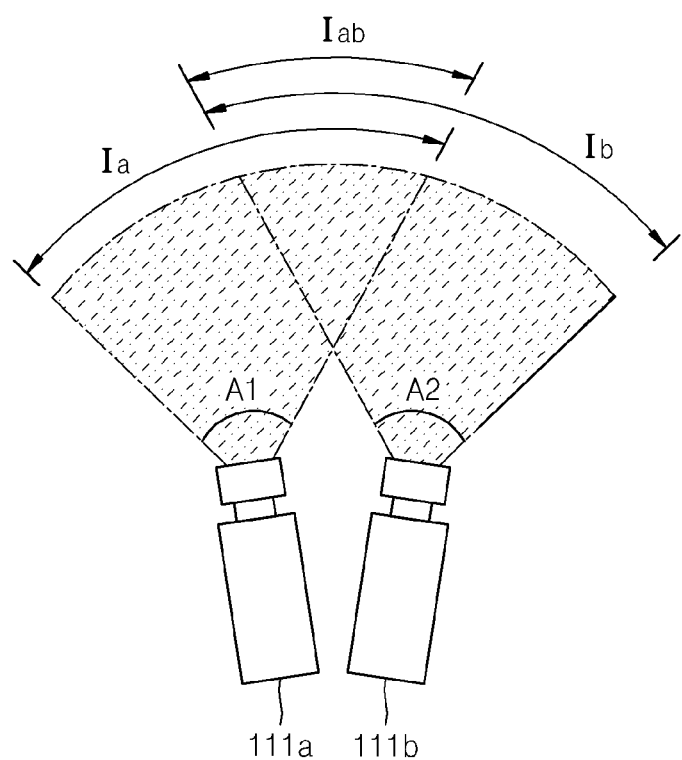
FIG. 6 illustrates a photographing method of two adjacent monitoring cameras, according to an exemplary embodiment.

The angle of view setter 123 sets an angle of view at which each of the plurality of monitoring cameras 111a through 111h photographs the area in sight. Referring to FIG. 5, each of the plurality of monitoring cameras 111a through 111h photographs the area in sight in a fixed state with a respective angle of view A. The number of monitoring cameras 111a through 111h for photographing an area omnidirectionally, that is, 360 degrees, is determined by the angle of view A. At this time, as illustrated in FIG. 6, angles of view A1 and A2 of two adjacent monitoring cameras, for example, the monitoring cameras 111a and 111b, are set to overlap with each other by half. In general, four monitoring cameras are necessary to photograph 360 degrees if the angle of view A is 90 degrees. However, in the present embodiment, eight monitoring cameras are necessary to capture a 3D image. If the angle of view A is 60 degrees, twelve monitoring cameras are necessary to photograph 360 degrees. A preset value of the angle of view of each of the plurality of monitoring cameras 111a through 111n may be changed by a user.

Figure 7:
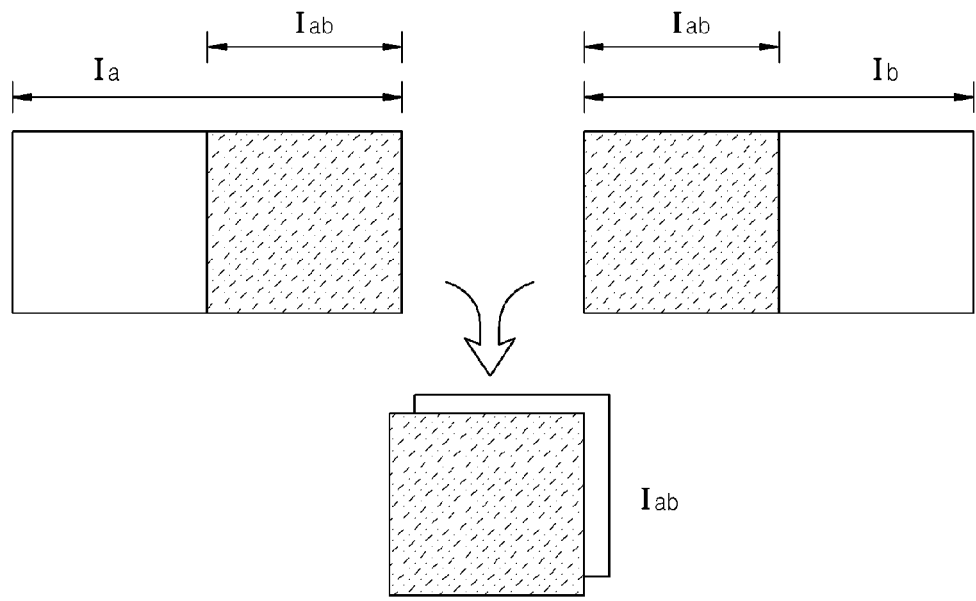
FIG. 7 illustrates overlapped images of two images generated by the photographing method of FIG. 6, according to an exemplary embodiment.

The first crop unit 124 crops overlapped images from among images generated by photographing of the monitoring cameras 111a through 111h, and generates a plurality of crop images. Referring to FIGS. 6 and 7, when the adjacent monitoring cameras 111a and 111b obtain images Ia and Ib by photographing the area in sight, overlapped images Iabs of the two images Ia and Ib may be generated, and the first crop unit 124 crops the overlapped images Iabs. The overlapped images Iabs have a viewpoint difference. That is, the monitoring camera 111a obtains the image Ia captured at an angle of view A1, and the monitoring camera 111b obtains the image Ib captured at an angle of view A2. Accordingly, there is a viewpoint difference between the image Ia captured at the angle of view A1 and the image Ib captured at the angle of view A2, and thus, there is a viewpoint difference between the overlapped images Iabs. A crop image obtained by adding the overlapped images Iabs having the viewpoint difference is a 3D image.

Figure 8:
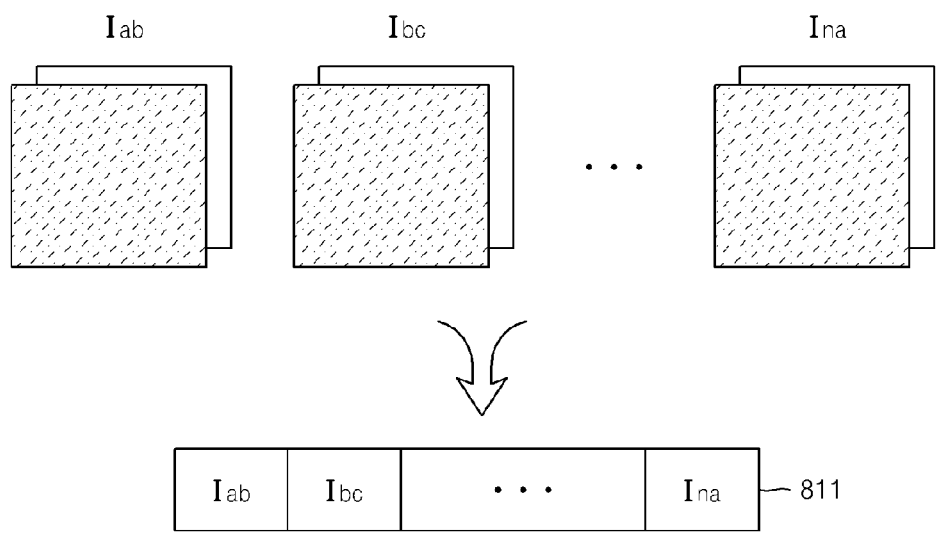
FIG. 8 is a diagram for explaining a method of generating a three-dimensional panorama image by adding the overlapped images of FIG. 7, according to an exemplary embodiment.

The panorama generator 125 generates a 3D panorama image by adding crop images cropped by the first crop unit 124 in order. For example, as illustrated in FIG. 8, a panorama image 811 is generated if a plurality of crop images illustrated in FIG. 8 are added in order, and the panorama image 811 is a 3D image. In addition, the panorama image 811 may include an omnidirectional image. Since the panorama image 811 is a 3D image, it is possible to extract space information about a specific area from the panorama image 811. In addition, a 2D image may be obtained if one of the overlapped images is removed from the panorama image 811.

Figure 9:
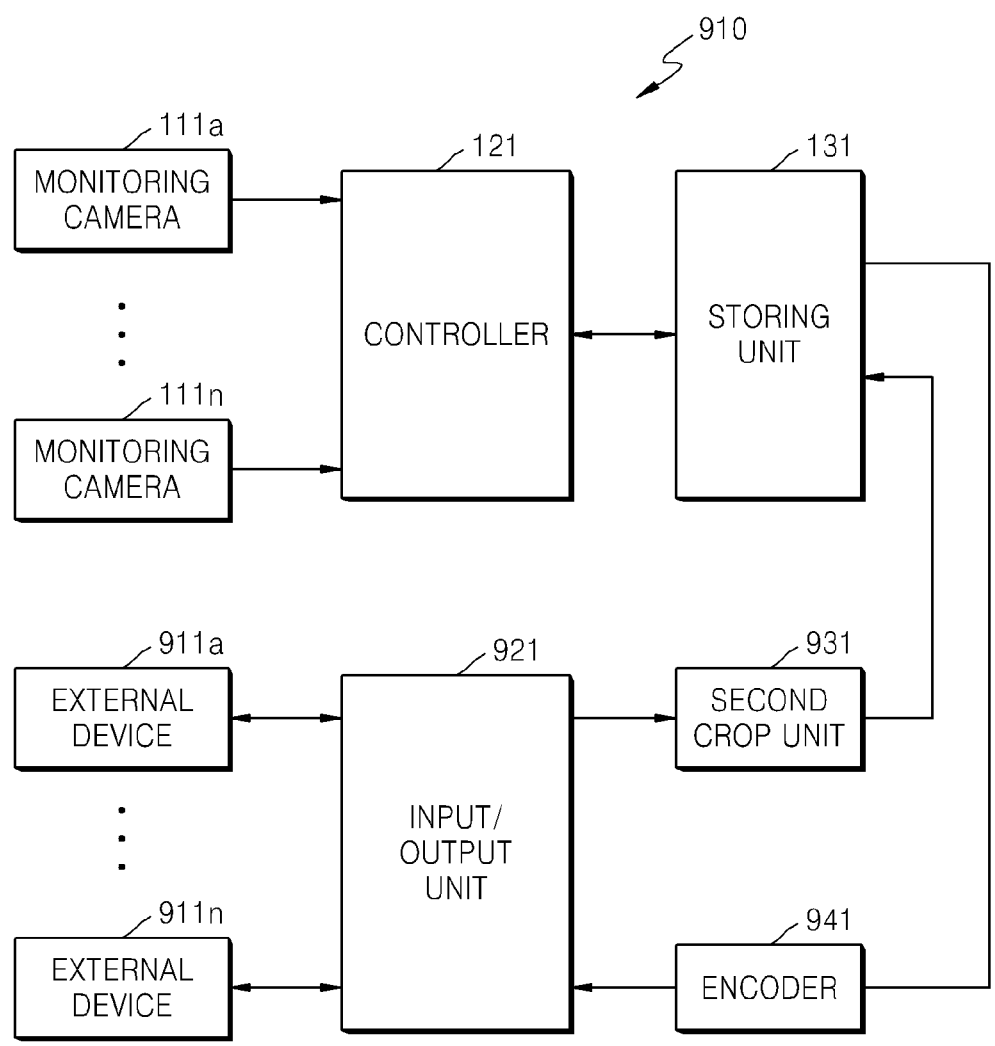
FIG. 9 is a block diagram of a monitoring system according to another exemplary embodiment.

FIG. 9 is a block diagram of a monitoring system 910 according to an exemplary embodiment. Referring to FIG. 9, the monitoring system 910 includes a plurality of monitoring cameras 111a through 111n, a controller 121, a storing unit 131, an input/output unit 921, a second crop unit 931, and an encoder 941. A plurality of external devices 911a through 911n are connected to the monitoring system 910.

Since the plurality of monitoring cameras 111a through 111n, the controller 121, and the storing unit 131 are the same as those explained with reference to FIGS. 1 through 8, a further explanation of them is omitted.

The input/output unit 921 receives data from the external devices 911a through 911n, buffers the data, and then, transmits buffered data to the second crop unit 931. In addition, the input/output unit 921 buffers a signal output from the encoder 941, and then, outputs a buffered signal to the external devices 911a through 911n.

The second crop unit 931 is connected to the plurality of external devices 911a through 911n wirelessly or through a network. The network may be the Internet or a local area network (LAN). The second crop unit 931 operates in response to signals which are transmitted from the plurality of external devices 911a through 911n. A user may produce desired images, which are cropped from a panorama image stored in the storing unit 131, through the plurality of external devices 911a through 911n, and then, display the desired images on a monitor (not shown) of the user or store the desired images in a memory (not shown). For this, signals which are transmitted by the plurality of external devices 911a through 911n include coordinates of images to be cropped.

The encoder 941 codes or encodes a signal output from the storing unit 131, and then, transmits the coded or encoded signal to the input/output unit 921.

Figure 10:
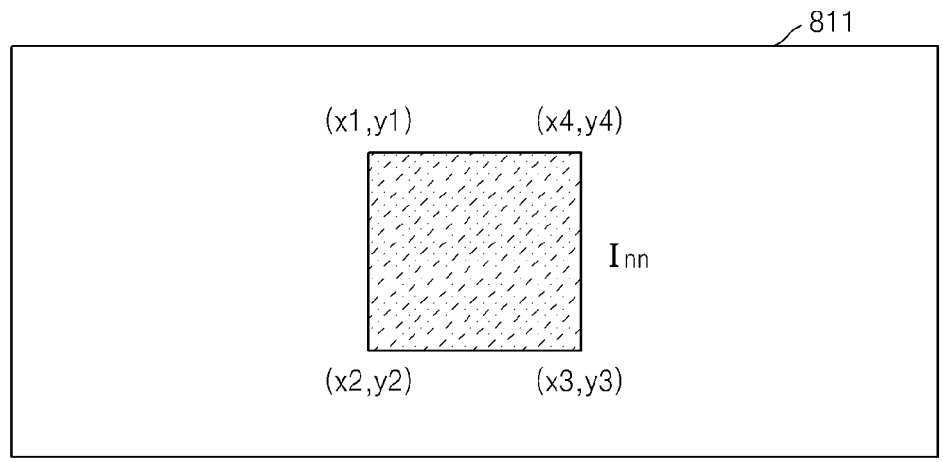
FIG. 10 is a diagram for explaining a method of cropping a specific image from the panorama image of FIG. 8, according to an exemplary embodiment.

Referring to FIG. 10, each signal transmitted from the external devices 911a through 911n includes four coordinates (x1,y1), (x2,y2), (x3,y3), and (x4,y4), and an image Inn corresponding to the four coordinates (x1,y1), (x2,y2), (x3,y3), and (x4,y4) is cropped from the panorama image 811 stored in the storing unit 131, and then, transmitted to an external device requesting the image Inn. That is, it is possible to monitor the area by cropping an image from the panorama image 811 regardless of a position if coordinates of a portion of the area are provided.

In this manner, it is possible to monitor portions of the area at various positions by using an electrical control instead of a mechanical driving such as a panning driving or a tilting driving of each of the monitoring cameras 111a through 111n. That is, it is possible to monitor the portions of the area at various positions through an electrical panning driving and an electrical tilting driving.

Figure 11:
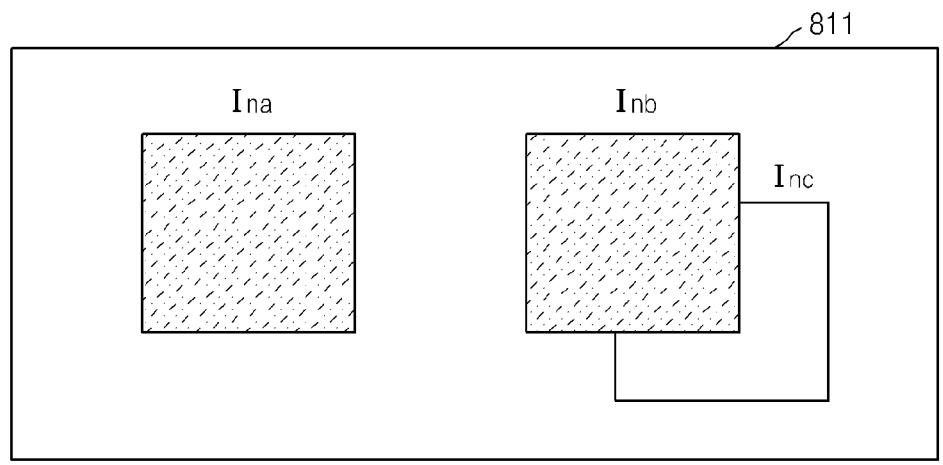
FIG. 11 is a diagram for explaining a method of cropping a plurality of images from the panorama image of FIG. 8, according to another exemplary embodiment.

Referring to FIG. 11, it is possible to monitor an area through a multi-access. That is, a plurality of observers may see images Ina, Inb, and Inc corresponding to portions of the area at desired positions by cropping the images Ina, Inb, and Inc from a panorama image 811 stored in the storing unit 131, by using the plurality of external devices 911a through 911n. Thus, the plurality of observers may simultaneously monitor an area desired by the plurality of observers.

The functions of the second crop unit 931 may be performed by the first crop unit included in the controller 121, according to an exemplary embodiment.

Figure 12:
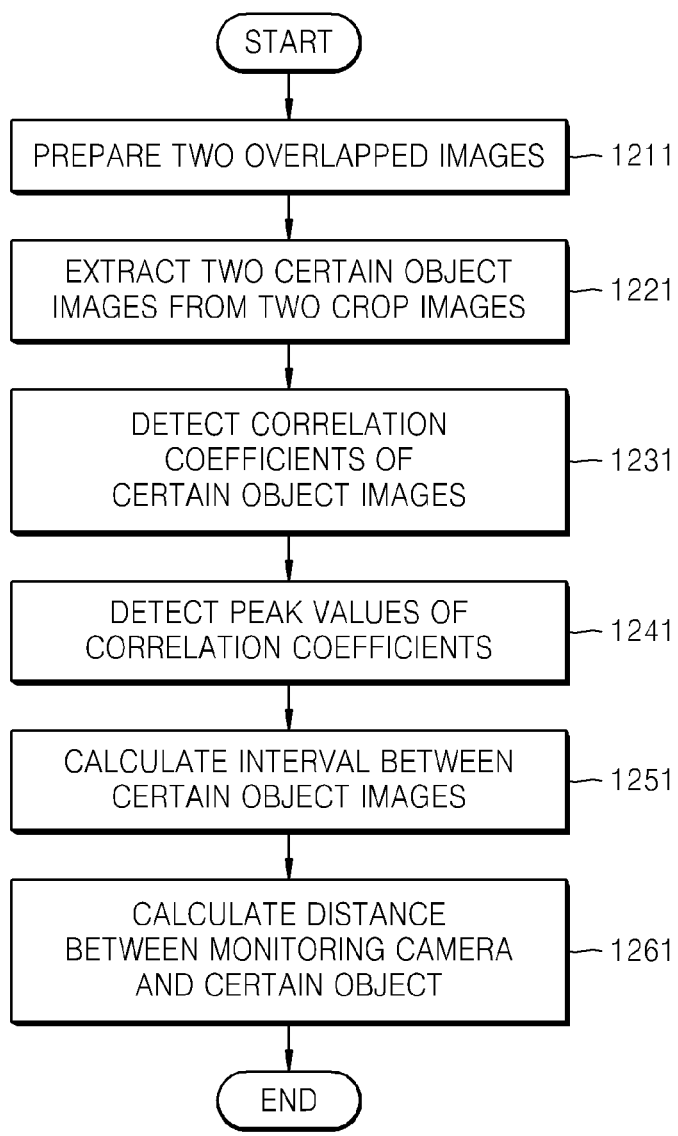
FIG. 12 is a flowchart illustrating a method of measuring a distance between a monitoring camera and an object by using a detected 3D image, according to an exemplary embodiment.

FIG. 12 is a flowchart illustrating a method of detecting a distance between the monitoring camera 111a of FIG. 5 and a certain object (not shown) by using a detected 3D image, according to an exemplary embodiment. Referring to FIG. 12, the method includes operations 1211 through 1261. According to an exemplary embodiment, the method of detecting the distance between the monitoring camera 111a and the certain object by using the detected 3D image may be performed by the controller 121 shown in FIG. 4.

Figure 13A:
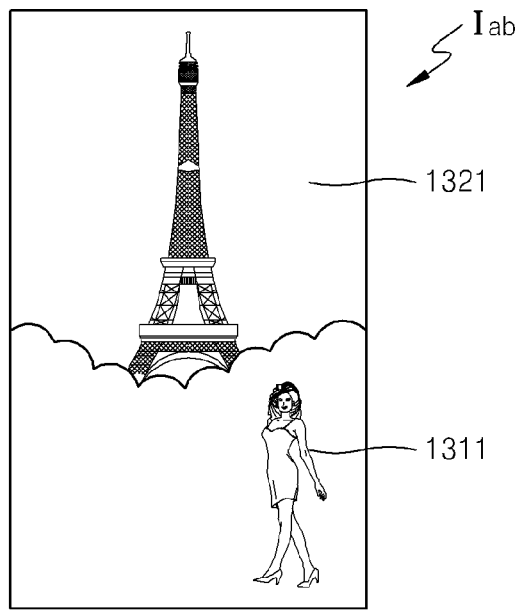
FIGS. 13A and 13B illustrate crop images generated by photographing a certain object, according to an exemplary embodiment.
Figure 13B:
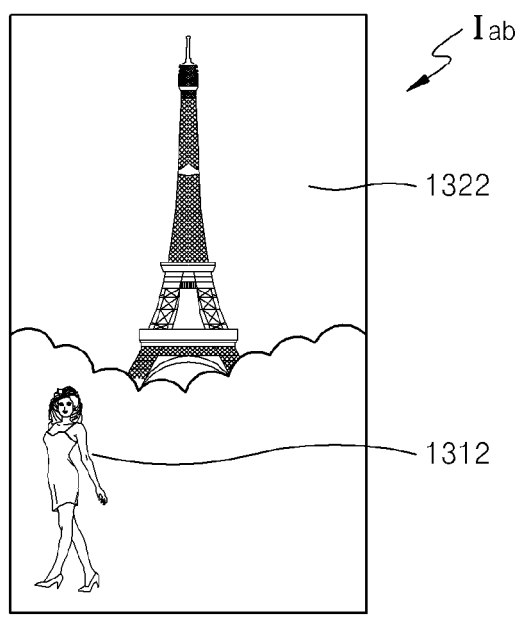

In operation 1211, two overlapped images Iabs of FIG. 7 generated by capturing respective images of the certain object by the monitoring camera 111a and another of the plurality of monitoring cameras 111b through 111h are prepared. The overlapped images Iabs may obtained by using the method described above in reference to FIGS. 6 and 7. Referring to FIGS. 13A and 13B, the two overlapped images Iabs of FIG. 7 generated by capturing the respective images of the certain object include object images 1311 and 1312 and background images 1321 and 1322.

Figure 14A:
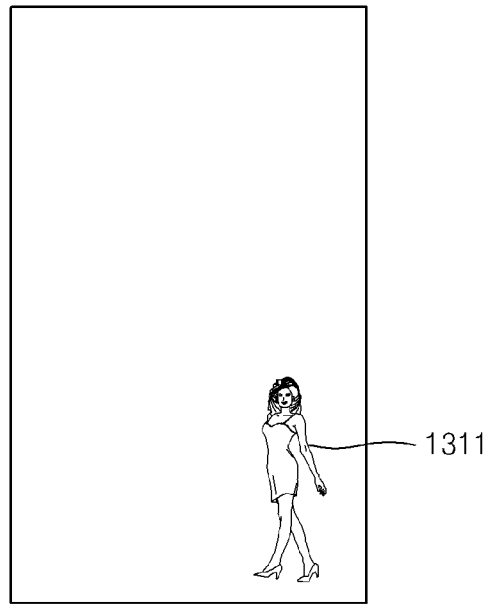
FIG. 14A illustrates an object image extracted by removing a background image from the crop image of FIG. 13A.
Figure 14B:
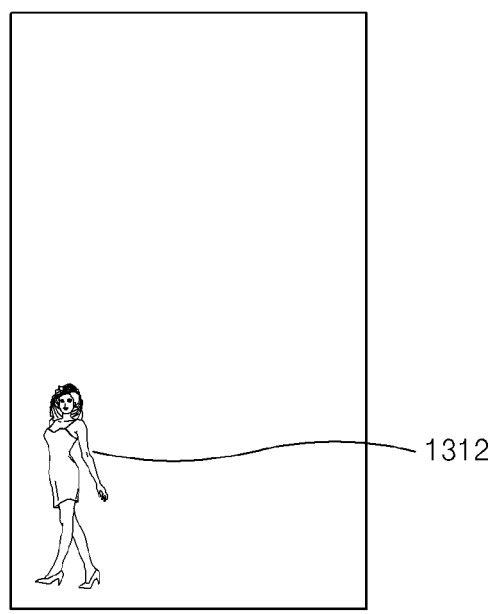
FIG. 14B illustrates an object image extracted by removing a background image from the crop image of FIG. 13B.

In operation 1221, the two object images 1311 and 1312 are extracted by removing the background images 1321 and 1322 from the two overlapped images Iabs of FIG. 7. FIG. 14A illustrates the object image 1311 extracted by removing the background image 1321 from the overlapped image Iab of FIG. 13A, and FIG. 14B illustrates the object image 1312 extracted by removing the background image 1322 from the overlapped image Iab of FIG. 13B.

In operation 1231, correlation coefficients c1 and c2 between the extracted object images 1311 and 1312 are detected from the extracted object images 1311 and 1312. Here, Equation 1 below may be used to detect the correlation coefficients c1 and c2.

Figure 15A:
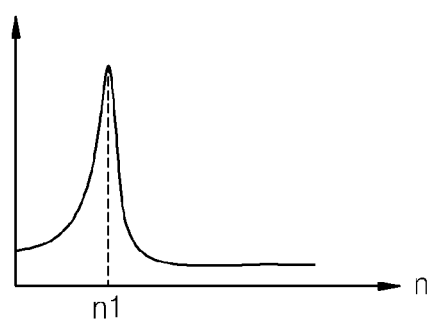
FIG. 15A is a graph showing a peak value of a correlation coefficient of the object image of FIG. 14A.
Figure 15B:
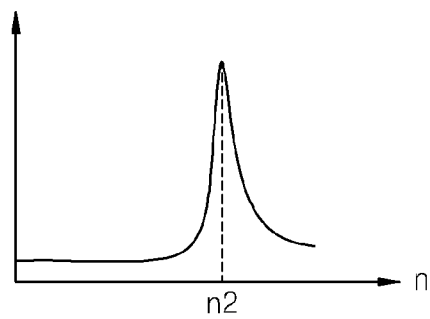
FIG. 15B is a graph showing a peak value of a correlation coefficient of the object image of FIG. 14B.

In operation 1241, peak values n1 and n2 of the correlation coefficients c1 and c2 are detected. Examples of the peak values n1 and n2 are shown in graphs of FIGS. 15A and 15B. Y axis in graphs of FIGS. 15A and 15B means correlation coefficient value.

In operation 1251, an interval s between the object images 1311 and 1312 is calculated by using the peak values n1 and n2. The interval s may be calculated by using Equation 1 below.

$$s = abs(n1 - n2) \quad [\text{Equation 1}]$$

Here, abs denotes an absolute value.

In operation 1261, a distance between the monitoring camera 111a of FIG. 5 and the certain object is calculated by applying the interval s between the object images 1311 and 1312. A general method may be used to calculate the distance between the monitoring camera 111a of FIG. 5 and the certain object by applying the interval s between the object images 1311 and 1312.

As described above, the distance between the monitoring camera 111a of FIG. 5 and the certain object may be measured by using a 3D image generated according to an exemplary embodiment, and a mask may be set only on the certain object by using the distance. Accordingly, a privacy mask performance may be remarkably improved. While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An apparatus for monitoring an area, the apparatus comprising:
    a plurality of monitoring cameras which are fixed so as not to move and arranged in a circular form on a plane to capture respective images of an area such that a portion of an angle of view of one monitoring camera overlaps a portion of an angle of view of another monitoring camera; and
    a controller comprising:
        an angle of view setter configured to set an angle of view at which each of the plurality of monitoring cameras captures a respective image of the area;
        a first crop unit configured to crop a plurality of overlapped images, each of the overlapped images being an image of the overlapped portion, from among the respective images captured by the plurality of monitoring cameras;
        panorama generator configured to generate a first three-dimensional (3D) image of the area according to a first overlapped image of the plurality of overlapped images cropped by the first crop unit and configured generate a 3D panorama image of the area by adding the first 3D image to a second 3D image generated according to a second overlapped image of the plurality of overlapped images cropped by the first crop unit; and
        a second crop unit configured to receive an external signal, configured to crop at least one partial image designated by the external signal from the 3D panorama image, and configured to output the cropped at least one partial image to the outside.

2. The apparatus of claim 1, wherein the monitoring cameras are configured such that the angle of view of each of the monitoring cameras is changed by a user.

3. The apparatus of claim 1, wherein space information about the area is obtained from the 3D image.

4. The apparatus claim 1, wherein the controller generates a two-dimensional (2D) image by removing one of the overlapped images from the 3D image.

5. The apparatus of claim 1, wherein the external signal comprises at least one set of coordinates and the second crop unit crops the at least one partial image corresponding to the at least one set of coordinates of the external signal.

6. The apparatus of claim 1, wherein the controller is configured to generate two overlapped images from among the overlapped images, configured to extract two object images by removing background images from the two overlapped images, configured to detect correlation coefficients between the two object images and peak values of the correlation coefficients, configured to calculate an interval between the two object images by using the peak values, and configured to calculate a distance between one of the monitoring cameras, capturing one of the two overlapped images, and the object by applying the interval between the object images.

7. A method of monitoring an area using a plurality of cameras, the method comprising:
    arranging a plurality of monitoring cameras which are fixed so as not to move and arranged in a circular form on a plane to capture respective images of an area such that a portion of an angle of view of one monitoring camera overlaps a portion of an angle of view of another monitoring camera;
    cropping a plurality of overlapped images, each of which is an image of the overlapped portion, from among the respective images captured by the plurality of monitoring cameras;
    generating a first three-dimensional (3D) image of the area according to a first overlapped image of the plurality of overlapped images;
    generating a 3D panorama image of the area by adding the first 3D image to a second 3D image generated according to a second overlapped image of the plurality of overlapped images: and
    receiving an external signal cropping at least one partial image designated by the external signal from the 3D panorama image, and outputting the cropped at least one partial image to the outside.

8. The method of claim 7, further comprising:
extracting two object images by removing background images from two of the overlapped images;
detecting correlation coefficients between the two object images;
detecting peak values of the correlation coefficients;
calculating an interval between the two object images by using the peak values; and
calculating a distance between one of the monitoring cameras which provides one of the two overlapped images, and the object by applying the interval between the two object images.

9. A method of measuring distance between a monitoring camera and an object, the method comprising:
generating two overlapped images by cropping overlapping portions of images of the object captured by two monitoring cameras;
extracting two object images by removing background images from the two overlapped images;
detecting correlation coefficients between the two object images;
detecting peak values of the correlation coefficients;
calculating an interval between the two object images by using the peak values; and
calculating a distance between one of the two monitoring cameras and the object by applying the interval between the two object images.

\* \* \* \* \*